US009826486B2

(12) United States Patent
Uplenchwar et al.

(10) Patent No.: US 9,826,486 B2
(45) Date of Patent: *Nov. 21, 2017

(54) POWER SETTING

(71) Applicant: UBIQUISYS LIMITED, Swindon (GB)

(72) Inventors: Pankaj Uplenchwar, Wiltshire (GB); Gbenga Salami, North Swindon (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/335,931

(22) Filed: Oct. 27, 2016

(65) Prior Publication Data
US 2017/0055225 A1    Feb. 23, 2017

Related U.S. Application Data

(63) Continuation of application No. 15/071,724, filed on Mar. 16, 2016, now Pat. No. 9,497,708, which is a
(Continued)

(30) Foreign Application Priority Data

Jul. 9, 2013    (GB) .................................. 1312321.1

(51) Int. Cl.
H04B 7/00      (2006.01)
H04W 52/14     (2009.01)
(Continued)

(52) U.S. Cl.
CPC ......... *H04W 52/146* (2013.01); *H04W 24/10* (2013.01); *H04W 52/143* (2013.01);
(Continued)

(58) Field of Classification Search
CPC . H04W 52/143; H04W 24/10; H04W 52/146; H04W 52/16; H04W 52/367
(Continued)

(56) References Cited

U.S. PATENT DOCUMENTS 6,141,565 A    10/2000   Feuerstein et al.
6,456,848 B1    9/2002   Freeman
(Continued)

FOREIGN PATENT DOCUMENTS

CN    1334999 A    2/2002
CN    101444125 A   5/2009
(Continued)

OTHER PUBLICATIONS

"ETSI TR 136 902 V9.3.1 (May 2011) Technical Report: LTE; Evolved Universal Terrestrial Radio Access Network 9E-UTRAN; Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
(Continued)

*Primary Examiner* — Dominic Rego

(57) ABSTRACT

One example method of operation of a basestation in a mobile communications network is disclosed. The basestation may operate on a carrier channel and may be a member of a group of such basestations within the network. The method comprises establishing the presence of an adjacent basestation outside the group, which basestation operates on a carrier channel at least partially overlapping the carrier channel of the basestation and determining a degree of association between the basestation and the adjacent basestation with reference to other group members. The method further comprises setting at least one of a maximum downlink power for transmissions from the basestation and a maximum uplink power for transmissions from user equipment devices attached to the basestation, based on the degree of association between the basestation and the adjacent
(Continued)

US 9,826,486 B2

Page 2 basestation. Also disclosed is a basestation operating in accordance with such a method.

20 Claims, 6 Drawing Sheets

Related U.S. Application Data continuation of application No. 14/326,188, filed on Jul. 8, 2014, now Pat. No. 9,344,970.

(51) Int. Cl.
  H04W 52/16 (2009.01)
  H04W 52/36 (2009.01)
  H04W 24/10 (2009.01)
  H04W 52/24 (2009.01)

(52) U.S. Cl.
  CPC ......... *H04W 52/16* (2013.01); *H04W 52/242* (2013.01); *H04W 52/367* (2013.01)

(58) Field of Classification Search
  USPC ... 455/522, 67.11, 68–70, 424, 426.1, 435.2, 455/436–444
  See application file for complete search history.

(56) References Cited

U.S. PATENT DOCUMENTS

| | | | |
|---|---|---|---|
| 6,463,296 B1 | 10/2002 | Esmailzadeh | |
| 6,600,924 B1 | 7/2003 | Sinivaara | |
| 6,771,934 B2 | 8/2004 | Demers | |
| 7,151,937 B2 | 12/2006 | Jin et al. | |
| 7,158,474 B1 | 1/2007 | Gerakoulis | |
| 7,379,739 B2 | 5/2008 | Rajkotia et al. | |
| 7,884,763 B2 | 2/2011 | Na et al. | |
| 7,974,652 B2 | 7/2011 | Gerlach | |
| 7,983,667 B2 | 7/2011 | Hart et al. | |
| 8,045,996 B2 | 10/2011 | Brunner et al. | |
| 8,078,185 B2 | 12/2011 | Sun | |
| 8,107,950 B2 | 1/2012 | Amerijoo et al. | |
| 8,126,495 B2 | 2/2012 | Wu | |
| 8,145,223 B2 | 3/2012 | Guey | |
| 8,145,252 B2 | 3/2012 | Sung et al. | |
| 8,170,544 B1 | 5/2012 | Satapathy et al. | |
| 8,194,630 B2 | 6/2012 | Qvarfordt | |
| 8,208,937 B2 | 6/2012 | Zhang | |
| 8,229,451 B2 | 7/2012 | Frenger et al. | |
| 8,270,976 B2 | 9/2012 | Simonsson et al. | |
| 8,275,376 B2 | 9/2012 | Vikberg | |
| 8,320,965 B2 | 11/2012 | Kwun | |
| 8,340,711 B1 | 12/2012 | Glass et al. | |
| 8,400,921 B2 | 3/2013 | Grayson et al. | |
| 8,483,743 B2 | 7/2013 | Dimou | |
| 8,538,337 B2 | 9/2013 | Damnjanovic | |
| 8,588,698 B2 | 11/2013 | Brisebois | |
| 8,611,299 B2 | 12/2013 | Yang et al. | |
| 8,619,563 B2 | 12/2013 | Madan et al. | |
| 8,639,243 B2 | 1/2014 | Radulescu et al. | |
| 8,687,585 B2 | 4/2014 | Marks et al. | |
| 8,694,044 B2 | 4/2014 | Hiltunen et al. | |
| 8,712,459 B2 | 4/2014 | Lim et al. | |
| 8,731,567 B2 | 5/2014 | Zhang | |
| 8,743,772 B2 | 6/2014 | Garavaglia et al. | |
| 8,755,791 B2 | 6/2014 | Bontu et al. | |
| 8,761,826 B2 | 6/2014 | Brown et al. | |
| 8,792,886 B2 | 7/2014 | Meshkati | |
| 8,797,983 B2 | 8/2014 | Sun | |
| 8,805,373 B2 | 8/2014 | Chayat | |
| 8,805,385 B2 | 8/2014 | Hunukumbure | |
| 8,830,936 B2 | 9/2014 | Ren | |
| 8,838,125 B2 | 9/2014 | Dalsgaard et al. | |
| 8,854,998 B2 | 10/2014 | Johansson et al. | |
| 8,862,134 B1 | 10/2014 | Zhou | |
| 8,874,126 B2 | 10/2014 | Jeong et al. | |
| 8,879,441 B2 | 11/2014 | Hunukumbure | |
| 8,983,470 B1 | 3/2015 | Ryan | |
| 9,014,004 B2 | 4/2015 | Nuss et al. | |
| 9,031,591 B2 | 5/2015 | Ma et al. | |
| 9,094,831 B2 | 7/2015 | Borran | |
| 9,143,995 B2 | 9/2015 | Okmyanskiy et al. | |
| 9,148,838 B2 | 9/2015 | Yanover et al. | |
| 9,167,444 B2 | 10/2015 | Nuss et al. | |
| 9,197,358 B2 | 11/2015 | Hejazi | |
| 9,219,816 B2 | 12/2015 | Grayson | |
| 9,313,004 B2 | 4/2016 | Yanover et al. | |
| 9,332,458 B2 | 5/2016 | Nuss et al. | |
| 9,344,970 B2 | 5/2016 | Uplenchwar et al. | |
| 9,414,310 B2 | 8/2016 | Grayson | |
| 9,490,953 B2 | 11/2016 | Yanover et al. | |
| 9,497,708 B2 | 11/2016 | Uplenchwar et al. | |
| 9,544,857 B2 | 1/2017 | Carter et al. | |
| 9,559,798 B2 | 1/2017 | Nuss et al. | |
| 9,648,569 B2 | 5/2017 | Madan et al. | |
| 9,655,102 B2 | 5/2017 | Uplenchwar et al. | |
| 2002/0019245 A1 | 2/2002 | Longoni | |
| 2002/0061742 A1 | 5/2002 | Lapaille | |
| 2004/0085909 A1 | 5/2004 | Soliman | |
| 2004/0132486 A1 | 7/2004 | Halonen | |
| 2004/0213170 A1 | 10/2004 | Bremer | |
| 2005/0063389 A1 | 3/2005 | Elliott | |
| 2005/0064820 A1 | 3/2005 | Park et al. | |
| 2005/0215251 A1 | 9/2005 | Krishnan | |
| 2005/0282572 A1 | 12/2005 | Wigard et al. | |
| 2006/0068712 A1 | 3/2006 | Kroboth et al. | |
| 2006/0073791 A1 | 4/2006 | Senarath | |
| 2006/0229087 A1 | 10/2006 | Davis et al. | |
| 2006/0292989 A1 | 12/2006 | Gerlach | |
| 2007/0008885 A1 | 1/2007 | Bonner | |
| 2007/0082620 A1 | 4/2007 | Zhang et al. | |
| 2007/0086406 A1 | 4/2007 | Papasakellariou | |
| 2007/0115874 A1 | 5/2007 | Usuda | |
| 2007/0177501 A1 | 8/2007 | Papasakellariou | |
| 2007/0253372 A1 | 11/2007 | Nakayasu | |
| 2007/0280170 A1 | 12/2007 | Kawasaki | |
| 2008/0004028 A1 | 1/2008 | Vincent | |
| 2008/0043623 A1 | 2/2008 | Franceschini | |
| 2008/0045227 A1 | 2/2008 | Nagai | |
| 2008/0084844 A1 | 4/2008 | Reznik | |
| 2008/0107074 A1 | 5/2008 | Salmenkaita et al. | |
| 2008/0139197 A1 | 6/2008 | Misra et al. | |
| 2008/0188234 A1 | 8/2008 | Gorokhov | |
| 2008/0188265 A1 | 8/2008 | Carter et al. | |
| 2008/0268833 A1 | 10/2008 | Huang | |
| 2009/0005030 A1 | 1/2009 | Han | |
| 2009/0054047 A1 | 2/2009 | Kylvaja | |
| 2009/0061778 A1 | 3/2009 | Vrzic | |
| 2009/0067370 A1* | 3/2009 | Kim | H04B 1/7083 370/328 |
| 2009/0081955 A1 | 3/2009 | Necker | |
| 2009/0092080 A1 | 4/2009 | Balasubramanian | |
| 2009/0092088 A1 | 4/2009 | Kokku | |
| 2009/0129284 A1 | 5/2009 | Jung et al. | |
| 2009/0129291 A1 | 5/2009 | Gupta | |
| 2009/0197632 A1 | 8/2009 | Ghosh | |
| 2009/0232074 A1 | 9/2009 | Yang et al. | |
| 2009/0270109 A1 | 10/2009 | Wang | |
| 2009/0323530 A1 | 12/2009 | Trigui et al. | |
| 2010/0009634 A1 | 1/2010 | Budianu | |
| 2010/0029282 A1 | 2/2010 | Stamoulis et al. | |
| 2010/0034157 A1 | 2/2010 | Stolyar et al. | |
| 2010/0056184 A1 | 3/2010 | Vakil | |
| 2010/0093358 A1 | 4/2010 | Cheong et al. | |
| 2010/0099424 A1 | 4/2010 | Centonza | |
| 2010/0105406 A1 | 4/2010 | Luo et al. | |
| 2010/0110989 A1 | 5/2010 | Wu | |
| 2010/0112982 A1 | 5/2010 | Singh et al. | |
| 2010/0124930 A1 | 5/2010 | Andrews | |
| 2010/0177722 A1 | 7/2010 | Guvenc | |
| 2010/0227611 A1 | 9/2010 | Schmidt et al. | |
| 2010/0233962 A1 | 9/2010 | Johansson | |
| 2010/0240314 A1 | 9/2010 | Chang | |
| 2010/0248737 A1 | 9/2010 | Smith | |

(56) References Cited

U.S. PATENT DOCUMENTS

| | | |
|---|---|---|
| 2010/0260036 A1 | 10/2010 | Molnar et al. |
| 2010/0260068 A1 | 10/2010 | Bhatt et al. |
| 2010/0267338 A1 | 10/2010 | Chiu |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0285795 A1 | 11/2010 | Whinnett |
| 2010/0309864 A1 | 12/2010 | Tamaki |
| 2010/0311449 A1 | 12/2010 | Whinnett |
| 2010/0317351 A1 | 12/2010 | Gerstenberger |
| 2010/0322109 A1 | 12/2010 | Ahn |
| 2011/0034174 A1 | 2/2011 | Xu |
| 2011/0039539 A1 | 2/2011 | Maida et al. |
| 2011/0039570 A1 | 2/2011 | Maida et al. |
| 2011/0070911 A1 | 3/2011 | Zhang |
| 2011/0077016 A1 | 3/2011 | Stolyar et al. |
| 2011/0081865 A1 | 4/2011 | Xiao |
| 2011/0086614 A1 | 4/2011 | Brisebois |
| 2011/0092209 A1 | 4/2011 | Gaal |
| 2011/0098072 A1 | 4/2011 | Kim |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0151881 A1 | 6/2011 | Chou |
| 2011/0171911 A1 | 7/2011 | Liu |
| 2011/0176497 A1 | 7/2011 | Gopalakrishnan |
| 2011/0182375 A1 | 7/2011 | Kim et al. |
| 2011/0188441 A1 | 8/2011 | Kim |
| 2011/0194423 A1 | 8/2011 | Cho et al. |
| 2011/0195730 A1 | 8/2011 | Chami |
| 2011/0195732 A1 | 8/2011 | Kim |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2011/0306347 A1 | 12/2011 | Choi |
| 2011/0310879 A1 | 12/2011 | Wu |
| 2011/0317742 A1 | 12/2011 | Kawahatsu |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046028 A1 | 2/2012 | Damnjanovic |
| 2012/0046063 A1 | 2/2012 | Chande |
| 2012/0083201 A1 | 4/2012 | Truong |
| 2012/0087247 A1 | 4/2012 | Min et al. |
| 2012/0087266 A1 | 4/2012 | Vajapeyam |
| 2012/0100849 A1 | 4/2012 | Marsico |
| 2012/0115534 A1 | 5/2012 | Luo |
| 2012/0129537 A1 | 5/2012 | Liu et al. |
| 2012/0157155 A1 | 6/2012 | Cho |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0243431 A1 | 9/2012 | Chen et al. |
| 2012/0258720 A1 | 10/2012 | Tinnakornsurisphap et al. |
| 2012/0265888 A1 | 10/2012 | Roeland et al. |
| 2012/0270536 A1 | 10/2012 | Ratasuk |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0029669 A1 | 1/2013 | Boudreau et al. |
| 2013/0044704 A1 | 2/2013 | Pang |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0109380 A1 | 5/2013 | Centonza |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1 | 10/2013 | Takaoka |
| 2013/0294356 A1 | 11/2013 | Bala et al. |
| 2013/0308531 A1 | 11/2013 | So et al. |
| 2013/0310019 A1 | 11/2013 | Visotsky |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Fernandez Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0087747 A1 | 3/2014 | Kronestedt |
| 2014/0092765 A1 | 4/2014 | Agarwal et al. |
| 2014/0098757 A1 | 4/2014 | Khandekar |
| 2014/0112251 A1 | 4/2014 | Kim et al. |
| 2014/0113643 A1 | 4/2014 | Ma et al. |
| 2014/0126537 A1 | 5/2014 | Chen et al. |
| 2014/0146732 A1 | 5/2014 | Olufunmilola et al. |
| 2014/0148149 A1 | 5/2014 | Kwan |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1 | 6/2014 | Liu |
| 2014/0185467 A1 | 7/2014 | Heo |
| 2014/0198678 A1 | 7/2014 | Kim et al. |
| 2014/0200001 A1 | 7/2014 | Song |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1 | 8/2014 | Chaudhuri |
| 2014/0220990 A1 | 8/2014 | Lorca Hernando |
| 2014/0226736 A1 | 8/2014 | Niu et al. |
| 2014/0233468 A1 | 8/2014 | Hejazi |
| 2014/0233530 A1 | 8/2014 | Damnjanovic |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0302851 A1 | 10/2014 | Yiu |
| 2014/0302859 A1 | 10/2014 | Nama et al. |
| 2014/0307685 A1 | 10/2014 | Takano |
| 2014/0321304 A1 | 10/2014 | Yu |
| 2014/0328277 A1 | 11/2014 | Xiao et al. |
| 2014/0328327 A1 | 11/2014 | Xiao et al. |
| 2014/0335909 A1 | 11/2014 | Czerepinski |
| 2014/0378145 A1 | 12/2014 | Legg |
| 2015/0004975 A1 | 1/2015 | Yamamoto |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1 | 3/2015 | Shen |
| 2015/0063225 A1 | 3/2015 | Kanamarlapudi |
| 2015/0063231 A1 | 3/2015 | Seo et al. |

(56) References Cited

U.S. PATENT DOCUMENTS

| | | |
|---|---|---|
| 2015/0087325 A1 | 3/2015 | Nuss et al. |
| 2015/0105025 A1 | 4/2015 | Zhang |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0237588 A1 | 8/2015 | Zhao et al. |
| 2015/0237637 A1 | 8/2015 | Venkatraman |
| 2015/0256314 A1 | 9/2015 | Gauvreau et al. |
| 2015/0282033 A1 | 10/2015 | Lunden |
| 2015/0282104 A1 | 10/2015 | Damnjanovic |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0365855 A1 | 12/2015 | Nuss et al. |
| 2015/0365865 A1 | 12/2015 | Bakker |
| 2015/0373698 A1 | 12/2015 | Uplenchwar et al. |
| 2015/0382367 A1 | 12/2015 | Yanover et al. |
| 2016/0073426 A1 | 3/2016 | Bull et al. |
| 2016/0094319 A1 | 3/2016 | Chaudhuri |
| 2016/0127069 A1 | 5/2016 | Nuss et al. |
| 2016/0150442 A1 | 5/2016 | Kwan |
| 2016/0157126 A1 | 6/2016 | Nuss et al. |
| 2016/0165485 A1 | 6/2016 | Kwan |
| 2016/0198412 A1 | 7/2016 | Uplenchwar et al. |
| 2016/0211955 A1 | 7/2016 | Wu |
| 2016/0219596 A1 | 7/2016 | Yanover et al. |
| 2016/0242122 A1 | 8/2016 | Yue |
| 2016/0309356 A1 | 10/2016 | Madan et al. |
| 2016/0309476 A1 | 10/2016 | Madan et al. |
| 2016/0315728 A1 | 10/2016 | Palenius |
| 2016/0373202 A1 | 12/2016 | Nuss et al. |
| 2017/0034795 A1 | 2/2017 | Madan |
| 2017/0041938 A1 | 2/2017 | Nabar |
| 2017/0064707 A1 | 3/2017 | Xiao |
| 2017/0094611 A1 | 3/2017 | Carter et al. |
| 2017/0150384 A1 | 5/2017 | Rune |

FOREIGN PATENT DOCUMENTS

| | | |
|---|---|---|
| CN | 104684052 A | 6/2015 |
| EP | 1322048 | 6/2003 |
| EP | 1718090 | 11/2006 |
| EP | 1895801 | 3/2008 |
| EP | 2166714 | 3/2010 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2566261 | 3/2013 |
| EP | 2018781 | 4/2013 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2000/038351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/079913 | 6/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/071308 | 5/2014 |
| WO | WO2014/087392 | 6/2014 |
| WO | WO2014/087393 | 6/2014 |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release

(56) References Cited

OTHER PUBLICATIONS

12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 125 469 v11.2.0, Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.

(56) References Cited

OTHER PUBLICATIONS

"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.

"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex, Oct. 2015; 79 pages.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.

"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.

"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.

"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.

"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.

"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.

"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.

"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.

"ETSI TS 136 214 V10.1.0 (Apr. 2011) Technical Specificaton: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.

"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.

"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.

"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.

"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.

"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.

"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.

"3GPP LTE Packet Data Convergence Protocol (PDCP) Sub Layer," EventHelix.com Inc., first published on or about Jan. 1, 2010; 20 pages.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.

"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.

"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

(56) References Cited

OTHER PUBLICATIONS

"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.

"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.

"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.

"3GPP TS 48.008 V8.8.0 (Dec. 2009) Technical Specification: 3rd Generation Partnership Project; Technical Specification Group GSM/EDGE Radio Access Network; Mobile Switching Centre-Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.

3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.

Adrangi, F., et al., "Chargeable User Identity," Network Working Group RFC 4372, Jan. 2006, 10 pages.

Andrews, Matthew, et al., "Optimal Utility Based Multi-User Throughput Allocation Subject to Throughput Constraints," IEEE INFOCOM 2005, Mar. 13-17, 2005, Miami, FL; 10 pages.

Ashraf, Imran, "Distributed Radio Coverage Optimization in Enterprise Femtocell Networks," International Conference on Communications ICC 2010, May 23-27, 2010, Cape Town, South Africa; 6 pages.

Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages; https://hal.inria.fr/hal-00763374.

(56) References Cited

OTHER PUBLICATIONS

Basir, Adnan, "3GPP Long Term Evolution (LTE), ICIC and eICIC," posted Jun. 11, 2012; 5 pages; http://4g-lte-world-blogspot.com/2012/06/icic-and-eicic.html.

Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.

"Bisection Method," Wikipedia, the free encyclopedia, Aug. 26, 2015; 5 pages.

"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.

"Broadband Forum Technical Report: TR-069 CPE WAN Management Protocol," Issue: 1, Amendment 4, Issue Date: Jul. 2011 Protocol Version 1.3; © The Broadband Forum; 190 pages.

"Broadband Forum Technical Report: TR-069 CPE WAN Management Protocol," Issue: 1, Amendment 5, Issue Date: Nov. 2013 CWMP Version 1.4; © The Broadband Forum; 228 pages.

"Broadband Forum Technical Report: TR-196 Frmto Access Point Service Data Model," Issue: 2, Issue Date: Nov. 2011; 46 pages.

Calhoun, P., "Diameter Base Protocol," Network Working Group RFC 3488, Sep. 2003; 147 pages.

Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.

"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Cisco's One Platform Kit (onePK)," Networking Software (IOS & NX-OS), Cisco Systems, Inc., First published on or about Mar. 3, 2014; 2 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.

Droms, R., "Dynamic Host Configuration Protocol," Network Working Group RFC 2131, Mar. 1997; 45 pages.

"E Band," from Wikipedia, the free encyclopedia, Dec. 24, 2013; 3 pages.

"EEM Configuration for Cisco Integrated Services Router Platforms," Configuration Guide for Cisco IOS® Embedded Event Manager (EEM), Cisco Systems, Inc., Feb. 2008; 17 pages.

"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.

Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.

Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages.

Ericsson, et al., "On the Feasibility of Operational Carrier Selection," 3GPP Draft R3-112991, 3rd Generation Partnership Project (3GPP), Mobile Competence Centre; 650; Route Des Lucioles; F-06921 Sophia-Antipolis; Nov. 2011, 7 pages.

"Fading," from Wikipedia, the free encyclopedia, Apr. 10, 2015; 6 pages.

"Frame Structure—Downlink," Share Technote, first published on or about Jul. 9, 2012; 13 pages; http://www.sharetechnote.com/html/FrameStructure_DL_.html.

"Fuzzy Logic," from Wikipedia, the free encyclopedia, Dec. 3, 2015; 12 pages.

Freescale Semiconductor, "Long Term Evolution Protocol Overview," White Paper, Document No. LTEPTCLOVWWP, Oct. 2008; 21 pages.

Ghaffar, Rizwan, et al., "Fractional Frequency Reuse and Interference Suppression for OFDMA Networks," published in "WiOpt" 10: Modeling and Optimization in Mobile, Ad Hoc, and Wireless Networks (2010), Jul. 19, 2010, 5 pages.

Goldsmith, A.J., et al., "Variable Rate Variable-Power MQAM for Fading Channels," IEEE Trans. on Comm. vol. 45, No. 10, Oct. 1997.

"GSMA LTE Roaming Guidelines, Version 9.0," GSM Association, Official Document IR88, Jan. 24, 2013; 53 pages.

Guttman, E., et al., "Service Location Protocol, Version 2," Network Working Group RFC 2608, Jun. 1999, 57 pages.

Haverinen, H., "Extensible Authentication Protocol Method for Global System for Mobile Communications (GSM) Subscriber Identity Modules (EAP-SIM)," Network Working Group RFC 4186, Jan. 2006, 93 pages.

Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of Oulu, Department of Computer Science and Engineering; Oct. 2013, 66 pages.

Holbrook, H., et al., "Source-Specific-Multicast for IP," Network Working Group RFC 4607, Aug. 2006.

Horn, Gavin, "3GPP Femtocells: Architecture and Protocols," Qualcomm Incorporated, 5775 Morehouse Drive, San Diego, CA, Sep. 2010; 64 pages.

"Hysteresis," from Wikipedia, the free encyclopedia; Oct. 1, 2015.

"Hybrid Automatic Repeat Request," from Wikipedia, the free encyclopedia, Jun. 8, 2015; 4 pages.

Ku, Gwanmo, "Resource Allocation in LTE," Adaptive Signal Processing and Information Theory Research Group, Nov. 11, 2011; 33 pages.

Kwan, R., et al., "A Survey of Scheduling and Interference Mitigation in LTE," vol. 2010, Article ID 273486, May 30, 2010.

Kwan, R., et al., "On Radio Admission Control for LTE Systems," Proc. of IEEE VTC-fail, Sep. 6-9, 2010.

La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.

Leung, K., et al., "WiMAX Forum/3GPP2 Proxy Mobile IPv4," Independent Submission RFC 5563, Feb. 2010; 41 pages.

Lopez-Perez, D., et al., "Interference Avoidance and Dynamic Frequency Planning for WiMAX Femtocells Networks," Proceedings of ICCS, Jun. 23-25, 2008.

LteWorld, "Packet Data Convergence Protocol (PDCP)," Information Page, LteWorld.org, published on or about Jan. 2, 2013; 2 pages.

"Link Layer Discovery Protocol," Wikipedia, the free encyclopedia, 4 pages, [Retrieved and printed Nov. 17, 2013]; http://en.wikipedia.org/wiki/Link_Layer_Discovery_Protocol.

"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.

"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.

(56) References Cited

OTHER PUBLICATIONS

"LTE Layers Data Flow," LTE Tutorial, tutorialspoint; first published on or about Jan. 17, 2013; 3 pages; http://www.tutorialspoint.com/lte/lte_layers_data_flow.htm.
"LTE Protocol Stack Layers," LTE Tutorial, tutorialspoint; first published on or about Jan. 16, 2013; http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON WI Status Overview, 3GPP Draft R2-093231," 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"RADIUS," Wikipedia, the free encyclopedia, 12 pages [Retrieved and printed Oct. 11, 2013] http://en.wikipedia.org/wiki/RADIUS.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz etal: "Low complexity approximate maximum throughput scheduling for LTE," 2010 44th ASILOMAR Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report, CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/a11-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.

(56) References Cited

OTHER PUBLICATIONS

Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document No. 3GPPEVOLUTIONWP; Jul. 2007; 27 pages.
EPO Jul. 29, 2014 Extended Search Report from European Application Serial No. EP13195673, 12 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Mar. 17, 2014 International Search Report and Written Opinion from International Application Serial No. PCT/IL2013/000086, 12 pages.
PCT Jun. 16, 2014 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].
Nokia Siemens Networks et al: "Enhanced ICIC considerations for HetNet scenarios", 3GPP Draft; R1-103822_EICIC_Overview, 3rd Generation Partnership Project (3GPP), Mobile Competence Centre; 650, Route Des Lucioles; F-06921 Sophia-Antipolis Cedex; France, vol. RAN WG1, no. Dresden, Germany; Jun. 28, 2010-Jul. 2, 2010, Jun. 22, 2010 (Jun. 22, 2010), XP050598481, [retrieved on Jun. 22, 2010] Section 3, 4 pages.
Qualcomm Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. RAN WG2, no. Jacksonville, USA; Nov. 15, 2010, Nov. 9, 2010 (Nov. 9, 2010), XP050492195, [retrieved on Nov. 9, 2010] Section 16.X.2, 5 pages.
"3GPP TS 36.300 V9.7.0 (Mar. 2011) Technical Specification: $3^{rd}$ Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.
EPO Nov. 21, 2016 Extended Search Report and Written Opinion from European Application Serial No. 16180195.6; 9 pages.
Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.
U.S. Appl. No. 15/374,903, filed Dec. 9, 2016, entitled "Power Management in a Cellular System," Inventors: Alan James Auchmuty Carter, et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.

(56) References Cited

OTHER PUBLICATIONS

U.S. Appl. No. 15/018,677, filed Feb. 8, 2016, entitled "Mitigation of Uplink Interference Within Heterogeneous Wireless Communications Networks," Inventor: Pankaj Uplenchwar, et al.
U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.
U.S. Appl. No. 15/251,471, filed Aug. 30, 2016, entitled "Method and Apparatus for Reducing Inter-Cell Interference," Inventor: Ziv Nuss, et al.
IPO Mar. 27, 2017 Intellectual Property Office Combined Search and Examination Report under Sections 17 and 18(3) from Application No. GB1703805.0; 5 pages.
PRC Apr. 7, 2017 SIPO First Office Action from Chinese Application No. 201280058324.X; 14 pages (English translation only).
U.S. Appl. No. 15/626,110, filed Jun. 17, 2017, entitled "System and Method to Facilitate Small Cell Uplink Power Control in a Network Environment," Inventors: Ritesh K. Madan, et al.
U.S. Appl. No. 15/630,696, filed Jun. 22, 2017, entitled System and Method to Provide Uplink Interference Coordination in a Network Environment, Inventor: Ritesh K. Madan.

* cited by examiner

POWER SETTING

CROSS-REFERENCE TO RELATED APPLICATION

This Application is a continuation (and claims the benefit of priority under 35 U.S.C. §120) of U.S. application Ser. No. 15/071,724, filed on Mar. 16, 2016, entitled "POWER SETTING," Inventors Pankaj Uplenchwar et al., which Application is a continuation (and claims the benefit of priority under 35 U.S.C. §120) of U.S. application Ser. No. 14/326,188, filed Jul. 8, 2014, entitled "POWER SETTING," Inventors Pankaj Uplenchwar et al., which claims priority from the Patent Application filed in the United Kingdom on 9 Jul. 2013, having Application Serial No. GB 1312321.1, entitled "POWER SETTING," the contents of which are hereby incorporated by reference in its entirety.

TECHNICAL FIELD

This present disclosure relates to a basestation for use in a cellular mobile communications network, and to an example method of operation of a basestation in which at least one of a maximum downlink power for transmissions from the basestation and a maximum uplink power for transmissions from user equipment devices attached to the basestation is set.

BACKGROUND

Small cell basestations are known and used in many cellular networks. A small cell basestation forms an access point that provides mobile coverage in areas where such coverage is problematic. Small cell basestations may for example be deployed in residential or business premises. The small cell basestation connects to the core network of a cellular network operator by means of an existing network connection. The device then provides cellular network coverage for subscribers within a coverage area of the device. Small cell basestations are intended to complement existing macro layer network coverage such that user equipment devices may attach to and use either a macro layer basestation or a small cell basestation, depending on their location. A cooperating group or network of such small cell basestations may be established, for example to provide service in larger premises having multiple floors or a significant surface area.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION OF EXAMPLE EMBODIMENTS

Overview

According to the present disclosure, there is provided a method of operation of a basestation in a mobile communications network, wherein the basestation operates on a carrier channel and is a member of a group of such basestations within the network, the method comprising: establishing the presence of an adjacent basestation outside the group, which basestation operates on a carrier channel at least partially overlapping the carrier channel of the basestation; determining a degree of association between the basestation and the adjacent basestation with reference to other group members; and setting at least one of a maximum downlink power for transmissions from the basestation and a maximum uplink power for transmissions from user equipment devices attached to the basestation, based on the degree of association between the basestation and the adjacent basestation. According to another aspect of the present disclosure, there is provided a basestation adapted to operate in accordance with the method of the first aspect of the disclosure.

Example Embodiments

Small cell basestations are typically intended to run autonomously, and thus have many self-configuration capabilities. One important self-configuration capability for a small cell basestation is the setting of power limits for downlink transmissions from the basestation and for uplink transmissions from user equipment devices attached to the basestation. For both uplink and downlink transmissions, devices should transmit at a power that is sufficiently high to ensure that signals can be exchanged over the whole of the intended coverage area of the basestation, while achieving acceptable efficiency levels and minimizing interference to adjacent basestations and their connected user equipment devices. In the case of a network of small cell basestations, each should set its downlink and uplink power to ensure acceptable signal quality over the whole of the intended coverage area of the network.

Some cellular network operators may maintain a dedicated carrier channel for small cell basestation deployment, or may deploy small cell basestations co-channel with a camping or capacity carrier channel. In other situations, an operator may offset straddle a small cell basestation carrier channel between the macro layer camping and capacity carriers. The offset may be even, with the small cell basestation carrier channel evenly straddled between the camping and capacity carriers. Alternatively, the offset may be uneven, with the small cell basestation carrier channel preferentially offset towards one or other of the camping or capacity carrier, for example to preferentially protect one of the macro channels from interference. In other situations, small cell basestations may operate or coexist with basestations operating according to other standards or technologies.

Figure 1:
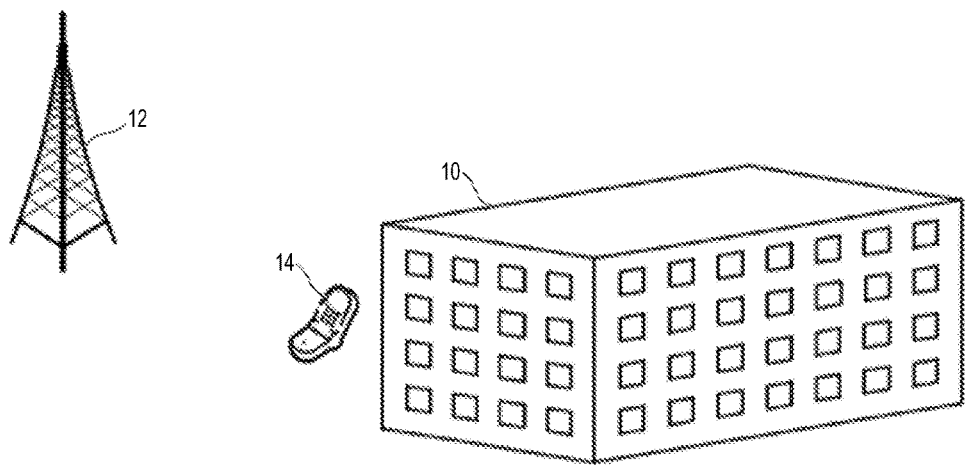
FIG. 1 illustrates a building within the coverage area of a basestation.

FIG. 1 shows a building 10, which is located within the coverage area of a macrocell basestation 12 of a cellular mobile communications network. User equipment devices (UEs), such as mobile phones 14, laptop computers, tablet computers etc that are in the vicinity of the building 10 can obtain mobile communication services by establishing a connection into the mobile network through the macrocell base station 12.

Network coverage within buildings can be variable and of poor quality, leading to unavailability of service or forcing UEs to transmit signals at high transmit powers, so reducing battery life. Small cell basestations may therefore be deployed within the building 10 allowing UEs to obtain services by connecting to the mobile communications network via one of the small cell basestations. Embodiments of the present disclosure are described below with reference to the deployment of small cell basestations within a building such as an office building, educational establishment or commercial building such as a shopping centre. It will be appreciated that embodiments of the disclosure are equally applicable to other deployment situations, including for example external deployment of small cell basestations, particularly but not exclusively in locations where there is common ownership and/or management of an area in which users are expected to circulate.

Figure 2:
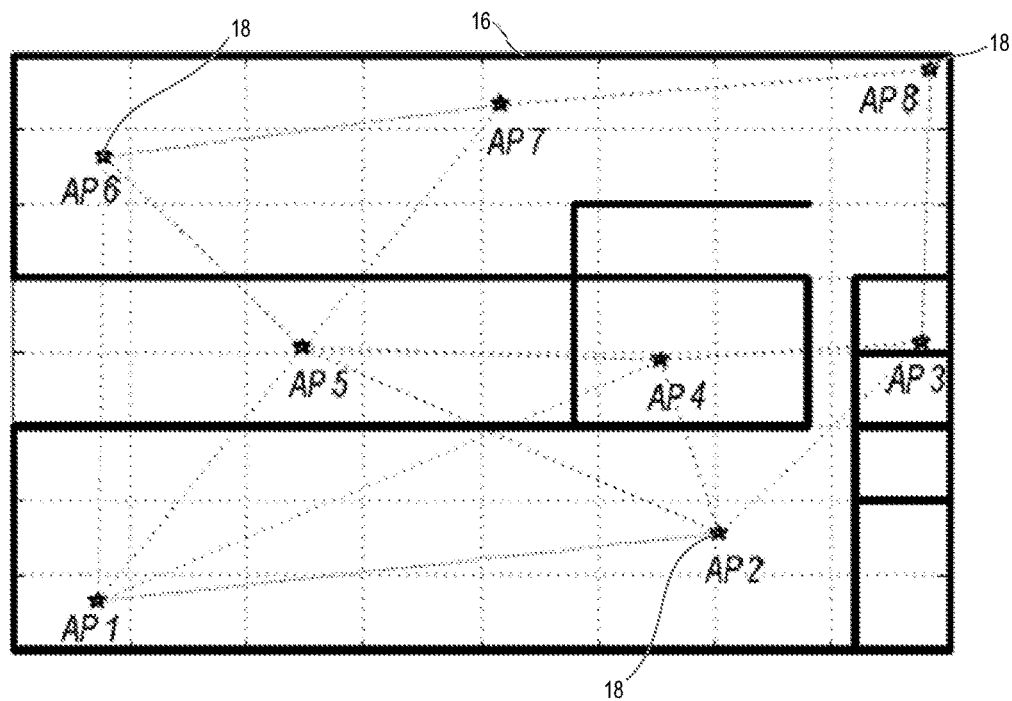
FIG. 2 illustrates small cell basestations deployed within a floor of the building of FIG. 1.

FIG. 2 illustrates small cell basestation deployment on one level 16 within the interior of the building 10. In the illustrated example, the building 10 is an office building, and the whole of the level 16 is occupied by a single corporate entity. Based on the number of expected users within the level 16 at any one time, a suitable number of small cell basestations, or access points (APs) 18 are deployed throughout the level. The eight small cell access points shown in FIG. 2 are indicated as AP1-AP8.

The small cell basestations 18 are located in suitable positions throughout the building level 18. For example, it may be appropriate to provide a small cell basestation close to the or each entrance/exit, so that users entering or leaving the building can spend as long as possible connected to one of the small cell basestations. In addition, the small cell basestations should be distributed throughout the space, so that any user within the space will be able to establish a connection with one of the small cell basestations.

Figure 3:
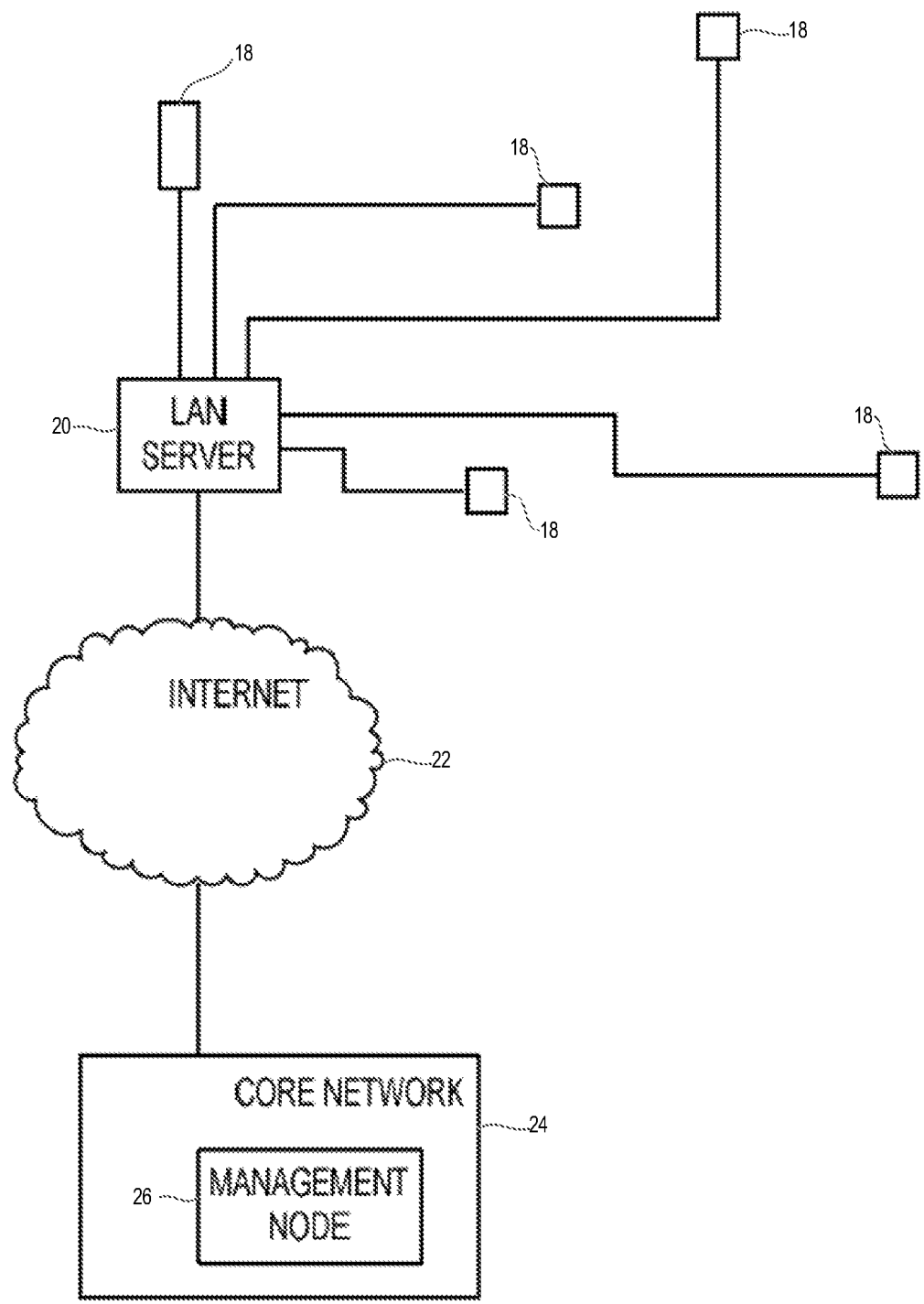
FIG. 3 is a schematic illustration of the connection of small cell basestations to the wider cellular network.

FIG. 3 is a schematic diagram illustrating network connections of the small cell basestations. The small cell basestations 18 form a group, each member of which is connected to a local area network (LAN) having a LAN server 20, which also has a connection to a wide area network 22, in particular a public wide area network such as the internet. The small cell basestations 18 are able to connect over the wide area network 22 to a core network 24 of the mobile communications network. The core network 24 includes a management node 26, which monitors and controls where necessary the operation of the small cell basestations 18.

In one example, the management node 26 distributes to all small cell basestations 18 in the group the relevant information about the group, including: the IDs of all small cell basestations in the group; and their main RF parameters, such as the UTRA Absolute RF Channel Number (UARFCN) and scrambling code (SC), the Location Area Code (LAC) and Cell-ID, as well as certain initial parameters for power setting. However, it should also be noted that the small cell basestations in the group are able to communicate directly with each other on a peer-to-peer basis.

Embodiments of the present disclosure are described below with reference to a small cell basestation operating in accordance with existing cellular standards set by 3GPP. However, it will be appreciated that the same techniques can be used in networks using all existing and future network standards in which the initial downlink power and/pr uplink power for an access point or basestation can be set based on information available at the time.

According to embodiments of the disclosure, the small cell basestation can enter the downlink monitor mode (DLMM), in which it can detect signals transmitted by other small cell basestations, to capture the identities of the neighbouring small cell basestations. Thus, by matching the detected UARFCN/SC and LAC/Cell-ID transmitted by each small cell basestation with the information received from the management node 26, the small cell basestation 18 is able to populate a neighbour table automatically. This neighbour table can then be used in the case of handovers for local mobility, supporting mobility within the group as well as to/from the macro layer. Cell-reselection with other small cell basestations is achieved by each broadcasting the relevant carrier and scrambling code information. Handover from one small cell basestation to another can be achieved because each small cell basestation has a full map of its neighbour small cell basestations, including their IDs, and so it can send a handover command that is unequivocally pointing to a specific small cell basestation.

In addition to information received from the management node 26 and peer-to-peer communication, each small cell basestation receives periodic measurement reports from its connected user equipment devices, with these reports indicating the signal strengths of intra-frequency neighbouring small cell basestations. Further, each small cell basestation sends measurement control messages to its connected user equipment devices that are operating in compressed mode, requiring them to provide periodic measurements of their inter-frequency neighbouring small cell basestations.

Finally, each small cell basestation is also able to communicate with the other small cell basestations via the local area network to which they are connected.

As discussed above, the small cell basestations 18 may be deployed on a carrier channel that is offset straddled between the carrier channels of network macro basestations. The offset may be even, such that the channel is evenly straddled between adjacent macro channels, or the small cell carrier channel may in some instances be preferentially offset towards one or other of the macro channels, for example to protect one of the channels from interference. It is also possible that the small cell basestations may be deployed on a carrier channel in use by a macro layer basestation of another network. For example, small cell basestations in a third generation mobile network may be deployed to coexist with other technologies including for example GSM. In some instances, the channel of the small cell basestations may overlap more or less completely with a neighbouring GSM basestation. This situation is known as co-GSM. Embodiments of the present disclosure enable a small cell basestation in an offset straddled or co-GSM deployment, and which is a part of a group of small cell basestations, to set its downlink and uplink power limits so as to satisfy the criteria discussed above. That is to satisfy required coverage for the cell, and group of cells, while maximising efficiency and minimising interference to adjacent macro layer or other network basestations.

According to embodiments of the disclosure, a small cell basestation first establishes the existence of a neighbouring basestation or basestations outside the group of small cell access points, which basestation is transmitting on a carrier channel, which overlaps with the carrier channel of the small cell basestation. The small cell basestation then determines the degree of association between itself and the adjacent basestation with reference to other group members. The degree of association between the small cell basestation and the adjacent basestation may be determined by the manner in which the small cell basestation established the existence of the adjacent basestation. For example, the small cell basestation may determine whether it was able to detect the adjacent basestation directly, or whether it was informed of the existence of the basestation by a neighbour small cell basestation. In the latter case, the small cell basestation may also determine the neighbour relation of the neighbour small cell basestation that detected the adjacent basestation. The distribution of the small cell basestations over their deployment area is likely to mean that one or more of the group of small cell basestations is closer to the macro layer basestation or basestations than others within the group. A neighbour small cell basestation may effectively block another small cell basestation from detecting the presence of the neighbour macro basestation. The manner in which the presence of the adjacent basestation was established therefore provides the degree of association between the small cell basestation and the adjacent basestation: direct detection, detection via a first tier neighbour, a second tier neighbour etc. Further detail of this process is discussed below with reference to specific embodiments.

The degree of association between the small cell basestation and the macro layer basestation is then used in setting at least one of a maximum downlink power for transmissions from the basestation and a maximum uplink power for transmissions from user equipment devices attached to the basestation. The greater the degree of association between the small cell basestation and the adjacent basestation, the greater the downlink power limit is set to be, and the smaller the uplink power limit is set to be, thus maintaining cell coverage while minimising interference. By basing the setting of power limits on the degree of association between the small cell basestation and the adjacent basestation, the small cell basestation cooperates with the other group members to maximise efficiency and coverage over the combined group coverage area while minimising adverse impact on the macro layer and any other basestations transmitting within the vicinity on overlapping carrier channels.

Figure 4:
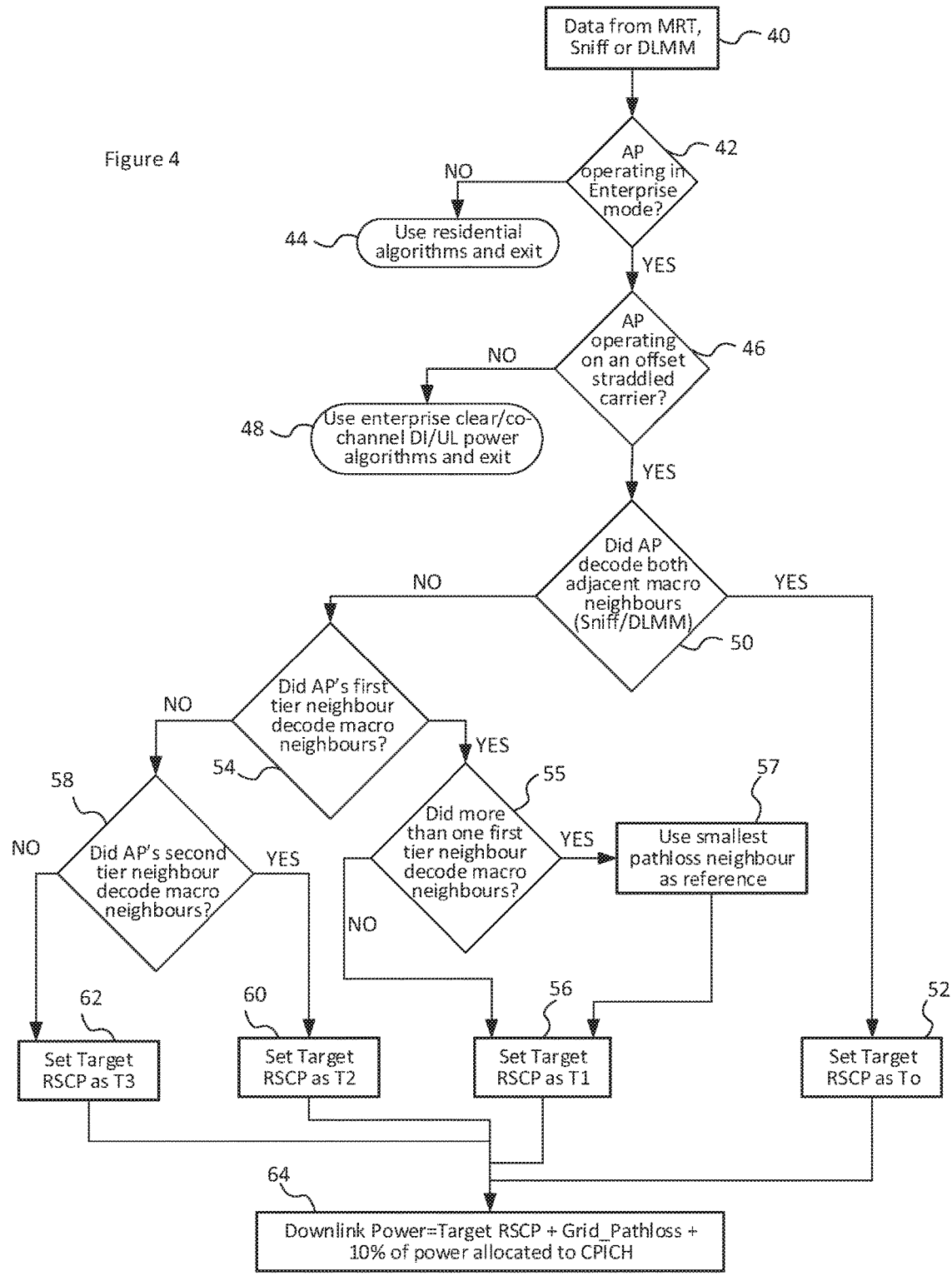
FIG. 4 is a flow chart illustrating a process for setting a downlink power in a basestation.

Embodiments of the present disclosure are described below, with reference to different deployment situations. In a first embodiment, the small cell basestations 18 of the group are deployed on a carrier channel that is evenly offset straddled between the macro carrier channels of the network. Setting of downlink and uplink power limits for this deployment situation is discussed below. FIG. 4 is a flow chart illustrating in general terms the process followed by a small cell basestation in such a deployment when setting its downlink power level. This procedure is preferably performed whenever the small cell basestation is powered up. The procedure can then be performed again whenever it appears that it would produce different results. For example, when the small cell basestation detects signals from a new nearby small cell basestation, the procedure can be performed again in order to check that the set downlink power remains optimal. The procedure for setting the uplink power is discussed below with reference to FIG. 5.

With reference to FIG. 4, in a first step 40, the small cell basestation receives information in the form of a Master Relationship Table (MRT) and also receives information obtained in its own downlink monitor mode (DLMM). As discussed above, in the DLMM, the small cell basestation is able to detect signals transmitted by other basestations, and is able to obtain the identity of each cell from which it is able to detect signals, and additional information such as the transmit powers used by such cells.

The Master Relationship Table includes information about each small cell basestation in the group, which information may include: the unique Cell ID of the small cell basestation; the Group ID of the small cell basestation; the frequency and Primary Scrambling Code selected by the small cell basestation; the Cell ID, Primary Scrambling Code, UARFCN, CPICH Tx power adjustment and CPICH Tx power of other small cell basestations and Macro Layer nodeBs detected by that small cell basestation; and strongest detected cell information.

Whenever a small cell basestation powers up for the first time it broadcasts a message to indicate that it now part of the network. A random small cell basestation then sends it a copy of the MRT so that it can start its automatic configuration.

New small cell basestations are generally added into the MRT with a particular time stamp (known as the creation time stamp). The priority of the small cell basestation is sometimes determined by the value of the time stamp.

Whenever a small cell basestation changes its configuration (either chooses a new frequency and/or scrambling code, or updates the Mobility Table) it will rebroadcast the MRT over the local area network with these changes. In addition, the management system may remove small cell basestations from the MRT if they appear to be inactive.

Having received the above information at step 40, the small cell basestation then proceeds to step 42, in which it establishes whether or not it is operating in "enterprise mode." Enterprise mode is the term used in the present disclosure to describe a mode of operation in which a group of cooperating small cell basestations is deployed. This term corresponds to the typical use of such group deployments for business or enterprise premises. If the small cell basestation determines at step 42 that it is not part of a group deployment, then it proceeds to follow appropriate algorithms for a single cell, or "residential" deployment and exits the process at step 44.

If the small cell basestation determines at step 42 that it is part of a group deployment, hence operating in enterprise mode, then it proceeds to determine at step 46 whether or not it is deployed upon an offset straddled carrier channel. As discussed above, the small cell basestation may be deployed co-channel with a macro basestation or on a clear channel. If this is the case, the small cell basestation proceeds at step 48 to follow enterprise clear/co-channel deployment power setting algorithms and to exit the process.

If the small cell basestation determines at step 46 that it is deployed on an offset straddled carrier, then it may proceed with the power setting process according to the present embodiment. This first involves establishing the degree of association of the small cell basestation to the macro neighbours whose presence has been established. Through the information receipt/exchange discussed above, the small cell basestation has established the presence of the adjacent macro basestation or basestations transmitting on the macro carriers between which its channel is offset straddled. The small cell basestation then proceeds to determine its degree of association with the adjacent macro basestations with reference to other members of the small cell group deployment. As discussed above, this may be done with reference to the neighbour relationship of the small cell basestation to that group member basestation which directly decoded the adjacent macro neighbours.

Other small cell basestations in the group may be categorised by a particular basestation according to their closeness as neighbours to that basestation. Based on the information received in step 40, the small cell basestation is able to divide the other small cell basestations in the group into tiers. The tier of a neighbour small cell basestation indicates the number of steps through which the small cell basestation has become aware of the neighbour.

Thus, a Tier 1 neighbour may be one, which the small cell basestation has itself detected in its Downlink Monitor Mode. Alternatively, the neighbour may have detected the first small cell basestation in its own Downlink Monitor Mode, and the first small cell basestation may have become aware of this through the Master Relationship Table and reciprocated the relationship.

A Tier 2 neighbour is one, which the small cell basestation has become aware of through a Tier 1 neighbour. Knowledge of the Tier 2 neighbour may be obtained from SIB (System Information Block) 11 of a Tier 1 small cell basestation or from a Macro Layer Neighbour. Alternatively, knowledge of the Tier 2 neighbour may be obtained by looking up the Master Relationship Table entry of a Tier 1 neighbour.

A Tier 3 neighbour is one, which the small cell basestation has become aware of by looking up the Master Relationship Table entry of a Tier 2 neighbour. Depending on the size of the network, lower Tier neighbours might also exist, with the small cell basestation becoming aware of them through looking up the Master Relationship Table entry of a neighbour in the previous tier.

If the small cell basestation has directly decoded its macro neighbours, then the small cell basestation has a high degree of association with the macro neighbours. If the small cell basestation became aware of the macro neighbours via a Tier 1 group neighbour, then the degree of association with the macro neighbours is less. If the small cell basestation became aware of the macro neighbours via a Tier 2 neighbour, then the degree of association is less again, and so on. Based upon this degree of association, the small cell basestation may calculate a target signal strength with which signals transmitted by the small cell basestation should be received, as discussed below. The downlink power may then be set to achieve the target signal strength.

The degree of association between the small cell basestation and the macro neighbours is established in steps 50, 54 and 58 of the process. In step 50, the small cell basestation establishes whether or not it was able directly to decode both of its adjacent macro neighbours. If the small cell basestation was able directly to decode both of its macro neighbours, then it proceeds at step 52 to set the target signal strength as $T_0$, the equation for which is discussed below. If the small cell basestation was not able directly to decode its macro neighbours, it then assesses at step 54 whether or not a first tier neighbour decoded the macro neighbours. If a first tier neighbour decoded the macro neighbours then the small cell basestation proceeds at step 56 to set the target signal strength as $T_1$, the equation for which is also discussed below. Having determined at step 54 that a first tier neighbour did detect the macro neighbours, the small cell basestation may then conduct additional checking steps 55 and 57 before setting the target signal strength as $T_1$, as discussed in further detail below. If a first tier neighbour was not able to decode the macro neighbours, the small cell basestation proceeds at step 58 to determine whether or not a second tier neighbour decoded the macro neighbours. If a second tier neighbour decoded the macro neighbours then the small cell basestation proceeds at step 60 to set the target signal strength as $T_2$. If a second tier neighbour was not able to decode the macro neighbours, the small cell basestation sets the target signal strength as $T_3$.

The target signal strengths $T_0$, $T_1$, $T_2$ and $T_3$ are calculated according to the following equations:

$$T_0 = \max\{\mathrm{min}enterpriseRSCP, (mean95\%\ adjacentRSCP - OffsetRSCP)\} \quad \text{Equation 1}$$

$$T_1 = \max\{\mathrm{min}enterpriseRSCP, (mean(mean95\%\ adjacentRSCP - OffsetRSCP), \mathrm{min}enterpriseRSCP)\} \quad \text{Equation 2}$$

$$T_2 = \mathrm{min}enterpriseRSCP \quad \text{Equation 3}$$

$$T_3 = \mathrm{min}enterpriseRSCP \quad \text{Equation 4}$$

Calculating $T_0$ involves the calculation of a reference signal strength, which is the average of the $95^{th}$ percentile of the Received Signal Code Power (RSCP) of the adjacent macro carriers between which the small cell basestation is offset straddled. This average is adjusted by OffsetRSCP, which is a margin included to account for the lower interference resulting from an offset straddled carrier compared to a co-channel carrier. In order to ensure sufficient signal dominance over the adjacent macro channels for the cell coverage area, $T_0$ is set as the larger of this reference signal strength and the minimum acceptable signal strength for a small cell basestation in an enterprise deployment. The minimum enterprise RSCP is a database parameter that may be configured according to operator requirements and received by the small cell basestation from the LAN. The reference target signal strength is the largest of the potential target signal strengths, being calculated as an average value of the signal strengths on the adjacent macro carriers. According to the present embodiment, the average value is a liner value calculated in mW and converted back into dBm.

Calculating $T_1$ involves calculating a reduced target signal strength, which is set in the event that a first tier neighbour, decoded the adjacent macros. The reduced target signal strength is calculated as an average of the reference value calculated for $T_0$ and the minimum enterprise RSCP. The average is calculated as a linear value in mW and converted back to dBm. As in the case of $T_0$, in order to ensure sufficient signal dominance over the adjacent macro channels, $T_1$ is set as the larger of this calculated signal strength and the minimum enterprise RSCP. Referring again to FIG. 4, if a first tier neighbour did detect the adjacent macros (yes at step 54), the small cell basestation may then check, at step 55 whether or not more than one first tier neighbour detected the adjacent macros. It is possible that more than one valid first tier neighbour may detect the adjacent macros, and further, that the two first tier neighbours may detect the neighbouring macros with differing signal strengths, owing to the differing positions of the first tier neighbours. In such cases (yes at step 55), the small cell basestation uses as its reference for the calculation of $T_1$ the first tier neighbour having the smallest pathloss to the small cell basestation (step 57). If only one first tier neighbour detected the adjacent macros (No in step 55), then the small cell basestation proceeds directly to the calculation of $T_1$.

Both $T_2$ and $T_3$ are set as the minimum enterprise RSCP and thus are anticipated to be smaller than the reference value and the reduced value signal strength in a majority of situations. Only in the event that the calculated values for the reference or reduced target signal strengths are smaller than the minimum value, will the lowest target signal strengths $T_2$ and $T_3$ be equal to either of $T_0$ and/or $T_1$.

Target signal strengths $T_2$ and $T_3$ are selected in the event that the adjacent macro basestations are detected by a second or higher tier neighbour. In such situations, the small cell basestation is not within the detection range of the macro neighbours. It may therefore be expected that the minimum enterprise RSCP will be sufficient to achieve good coverage for the small cell basestation. Small cell basestations that are closer to or within the detection range of the adjacent macro basestations (basestations detected by a first tier neighbour or by the small cell basestation itself) require a higher target RSCP ($T_1$ or $T_0$) in order to ensure good coverage for the small cell basestation.

The effect of the decision making steps 50, 54 and 58 and the above described equations is to set a higher target signal strength for a small cell basestation having a higher degree of association with the neighbour macro basestations and a lower target signal strength for a small cell basestation having a lower degree of association with the neighbour macros.

After setting the target RSCP in step 52, 56, 60 or 62, the small cell basestation then proceeds to calculate the downlink power that will provide the target signal strength at step 64. The downlink power is calculated according to the following equation:

$$DLPower = TargetRSCP + GridPathloss + 10\% \, powerCPICH \quad \text{Equation 5}$$

The TargetRSCP is the value of $T_0$, $T_1$, $T_2$ or $T_3$ calculated as appropriate according to the degree of association determined in steps 50, 54, and/or 58. The GridPathloss is a database parameter representing pathloss in the enterprise deployment situation. This configurable parameter is the same for all small cell basestations in the group in an initial power setting process, but may be replaced by a value derived from measurements made during operation for the setting of ongoing power limits, as discussed in further detail below. By setting the DL power to achieve the calculated target signal strength, the process ensures that the DL power is set so as to achieve the above-discussed goals of ensuring cell area coverage while maximising efficiency and minimising interference to neighbouring macro cells.

When the process of FIG. 4 is followed for the setting of initial power limits, the RSCP measurements used to calculate target RSCP $T_0$ and/or $T_1$ are those measurements obtained in the downlink monitor mode (DLMM). When the process is followed at any time subsequent to initial setup, these measurements may be enhanced by the use of measurements obtained from connected UEs in compressed mode, or by measurements obtained through fast sniff, so ensuring the calculated target signal strength reflects as closely as possible the RF environment at the time. Additionally, the database parameter GridPathloss used in calculating the downlink power may be replaced by a Mean Grid Pathloss, which is the estimated average grid pathloss obtained from the participating small cell basestations in the group. In this manner, the ongoing downlink power limit may continue to reflect the conditions at the deployment site.

The above discussion illustrates how a small cell basestation may set its initial and ongoing downlink power limit when operating on a carrier channel that is evenly offset straddled between the neighbouring macro channels. As previously discussed, the group of small cells may operate on a carrier channel that is preferentially offset towards one or other of the neighbouring macro channels. This "preferentially offset straddled" deployment may protect one or other of the carrier channels, or may be selected to reflect a particular geographical deployment of adjacent macrocell basestations. In the case of a preferentially offset straddled deployment, the procedure for setting initial and ongoing downlink power is substantially as discussed above for an evenly offset straddled carrier, with the exception of the calculation of the target RSCP values $T_0$ and $T_1$. In a preferentially offset straddled deployment, the average of the $95^{th}$ percentile of adjacent RSCP values (mean95% adjacentRSCP) is calculated as a weighted average to reflect the uneven frequency offset of the carrier channel with respect to the two adjacent macro channels. Weighting factors may be applied to the two RSCP values in proportion to the frequency offset of the small cell basestation carrier channel with respect to the two adjacent macro channels. The equations for target RSCP $T_0$ and $T_1$ may be modified as follows in the event of a preferentially offset straddled deployment:

$$T_{0-a} = \max \begin{cases} \text{min}enterpriseRSCP, \\ \begin{pmatrix} 10\log 10(\{W1 * 10(95^{th} percentileCarrier1/10)\} + \\ \{W2 * 10(95^{th} percentileCarrier2/10)\}) \\ -OffsetRSCP \end{pmatrix} \end{cases} \quad \text{Equation 1a}$$

$$T_{1-a} = \max \left\{ \begin{array}{l} \text{min}enterpriseRSCP, \\ \left( \text{mean} \left( \begin{array}{l} 10\log 10 \left( \left\{ W1 * \left( \dfrac{95^{th} percentileCarrier1}{10} \right) \right\} + \right. \\ \left. \left\{ W2 * \left( \dfrac{95^{th} percentileCarrier2}{10} \right) \right\} \right) \\ -OffsetRSCP, \text{min}enterpriseRSCP \end{array} \right) \right) \end{array} \right\} \quad \text{Equation 2a}$$

W1 and W2 represent the weights applied to the contributions of the two adjacent macro carrier channels. The values for W1 and W2 are set in proportion to the frequency offset of the small cell basestation carrier channel with respect to the two adjacent macro channels.

$T_2$ and $T_3$ remain unchanged for the preferentially offset straddled case, as the minimum enterprise RSCP value is used.

Figure 5:
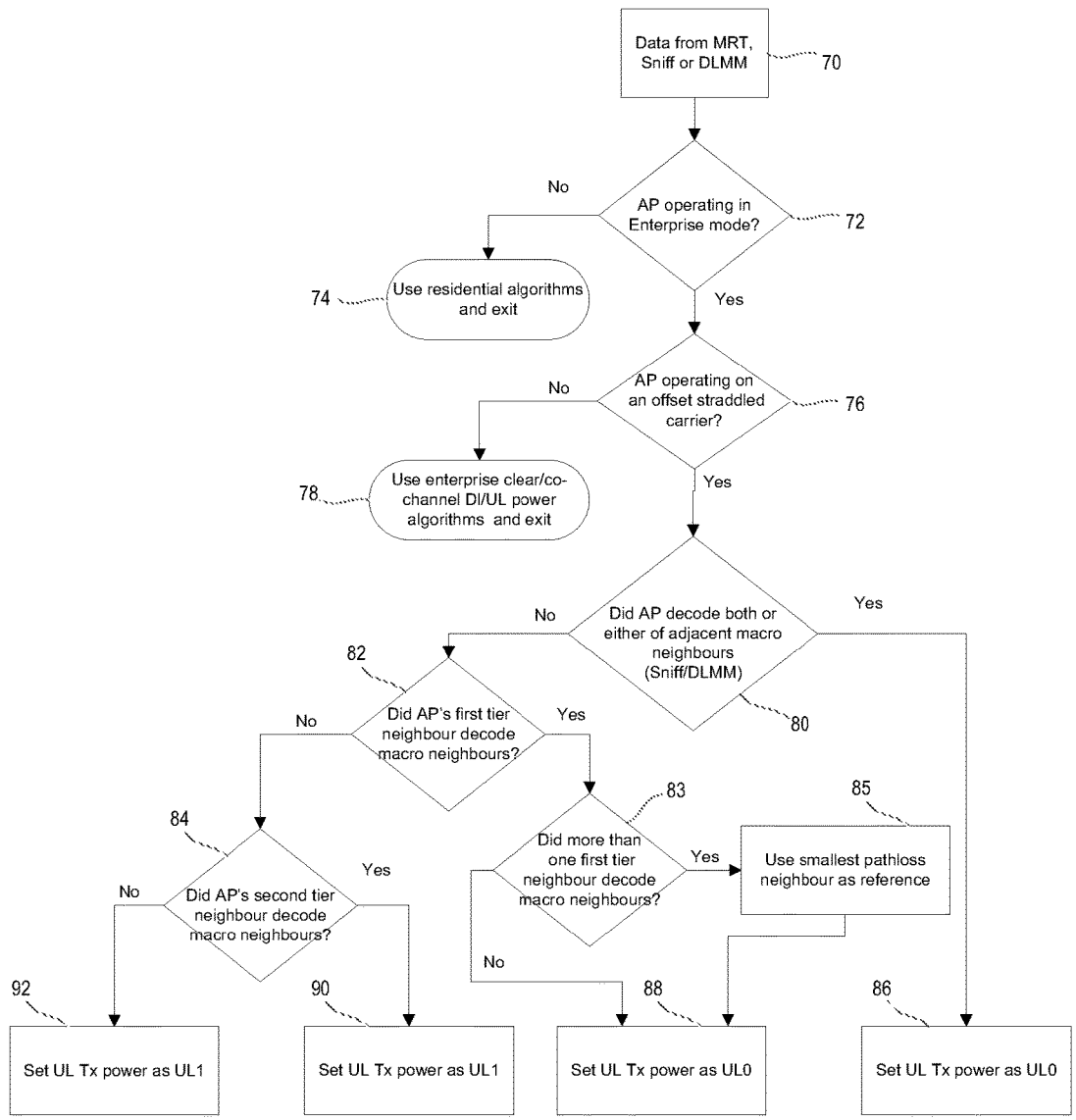
FIG. 5 is a flow chart illustrating a process for setting an uplink power for transmissions to a basestation.

Considering now the uplink power situation in the present embodiment, FIG. 5 is a flow chart illustrating in general terms the process followed by a small cell basestation according to the present embodiment when setting the uplink power level for its connected UEs. As for the downlink power setting, this procedure is preferably performed whenever the small cell basestation is powered up. The procedure can then be performed again whenever it appears that it would produce different results. For example, when the small cell basestation detects signals from a new nearby small cell basestation, the procedure can be performed again in order to check that the set uplink power remains optimal.

Referring to FIG. 5, the process for setting uplink power follows initial steps 70, 72, 74, 76 and 78, which are equivalent to steps 40 to 48 followed in the process for setting downlink power. In these steps, the small cell basestation establishes that it is operating in a group of small cell basestations (enterprise mode) and is deployed on an offset straddled carrier channel. If the small cell basestation is an a "residential" deployment or operating on a clear or co-channel enterprise deployment, the basestation exits the process of FIG. 5 to follow the appropriate residential or clear/co-channel power setting algorithms.

Having established that it is in an enterprise offset straddled deployment, the small cell basestation then proceeds to establish the degree of association of the small cell basestation to the macro neighbours. As discussed above in connection with downlink power setting, this is done with reference to the neighbour relationship of the small cell basestation to that group member basestation which directly decoded the adjacent macro neighbours.

The small cell basestation sets the uplink power limit for its attached UEs to a value $UL_0$ or $UL_1$ according to the degree of association between the small cell basestation and the macro neighbours. The small cell basestation conducts substantially equivalent procedural steps to those followed for downlink power setting, checking whether it was the small cell basestation itself that decoded the macro neighbours (step 80), or a first tier neighbour (step 82), or a second tier neighbour (step 84). If the macro neighbours were decoded by the small cell basestation itself or by a first tier neighbour, the small cell basestation sets the uplink power limit to be $UL_0$ in step 86 for self-detection or step 88 for detection by a Tier 1 neighbour. In the case of detection by a first tier neighbour, the small cell basestation may perform the additional steps 83 and 85 as illustrated in FIG. 5 and discussed below. If the macro neighbours were decoded by a second or lower tier neighbour, the small cell basestation sets the uplink power limit as $UL_1$, in step 90 or 92 respectively. The uplink power limits $UL_0$ and $UL_1$ are calculated according to the following equations:

$$UL_0 = NodeBNoiseFloor + SmallestSmallCelltoMacro\text{-}Pathlass - ULNoiseRiseMargin \quad \text{Equation 6}$$

$$UL_1 = MaximumPermittedULTxPower \quad \text{Equation 7}$$

The NodeB noise floor and uplink noise rise margin are database configurable parameters, which may be communicated to the small cell basestation as part of the information exchange of step 70. In the setting of initial uplink power, the smallest small cell to macro pathloss is obtained through initial network listen. In the setting of ongoing uplink power limits, the smallest small cell to macro pathloss may be adjusted using measurements obtained from fast sniff, optionally complemented with UE compressed mode measurements if available. With reference to step 88, if the uplink power limit is set as $UL_0$ following detection of adjacent macros by a first tier neighbour, the small cell basestation may first determine at step 83 whether the adjacent macros were detected by more than one first tier neighbour. As discussed with reference to FIG. 4, it is possible that more than one valid first tier neighbour may detect the adjacent macros, and further, that the two first tier neighbours may detect the neighbouring macros with differing signal strengths, owing to the differing positions of the first tier neighbours. If this were the case, the two first tier neighbours would have differing uplink transmit power limits, as the detected signal strength of the macros translates to the pathloss used to calculate the uplink pathloss. In such cases (yes at step 83), the small cell basestation uses as its reference for the calculation of $UL_0$ the first tier neighbour having the smallest pathloss to the small cell basestation (step 85). If only one first tier neighbour detected the adjacent macros (No in step 83), then the small cell basestation proceeds directly to the calculation of $UL_0$.

The maximum permitted UL transmit power is also a database configurable parameter, and is set as the uplink power in situations where the small cell basestation established the existence of its macro neighbours through a second or lower tier neighbour. In such situations, the level of association between the small cell basestation and its macro neighbours is low, indicating that the uplink power for connected UEs may be set to a maximum level without risking undue interference to the macro neighbours.

In a preferentially offset straddled deployment situation, the smallest small cell to macro pathloss may be calculated by applying weighting factors to account for uneven small cell channel offset from the adjacent macro carriers, as illustrated in Equation 8 below:

$$SmallestSmallCelltoMarcoPathloss = \\ 10\log10\left(\begin{array}{l}\{W1*10^{(1stPercentileCarrier1\_PL/10)}\} + \\ \{W2*10^{(1stPercentileCarrier2\_PL/10)}\}\end{array}\right) \quad \text{Equation 8}$$

W1 and W2 represent the weights applied to the contributions of the two adjacent macro carrier channels. The values for W1 and W2 are in proportion to the frequency offset of the small cell basestation carrier channel with respect to the two adjacent macro channels.

The above discussion illustrates how downlink and uplink power limits may be set for a small cell within a group of small cells operating on an evenly or preferentially offset straddled carrier channel. As discussed previously, a group or network of small cells may also be deployed co-channel with a basestation of another network, which may be operating according to a different generation of mobile technology. This may be the case for example in a 3G network where a group of small cells is deployed to operate on the same carrier channel as a neighbouring GSM basestation. Power setting in this co-GSM deployment situation is illustrated in FIGS. 6 and 7, according to another embodiment of the present disclosure.

Figure 6:
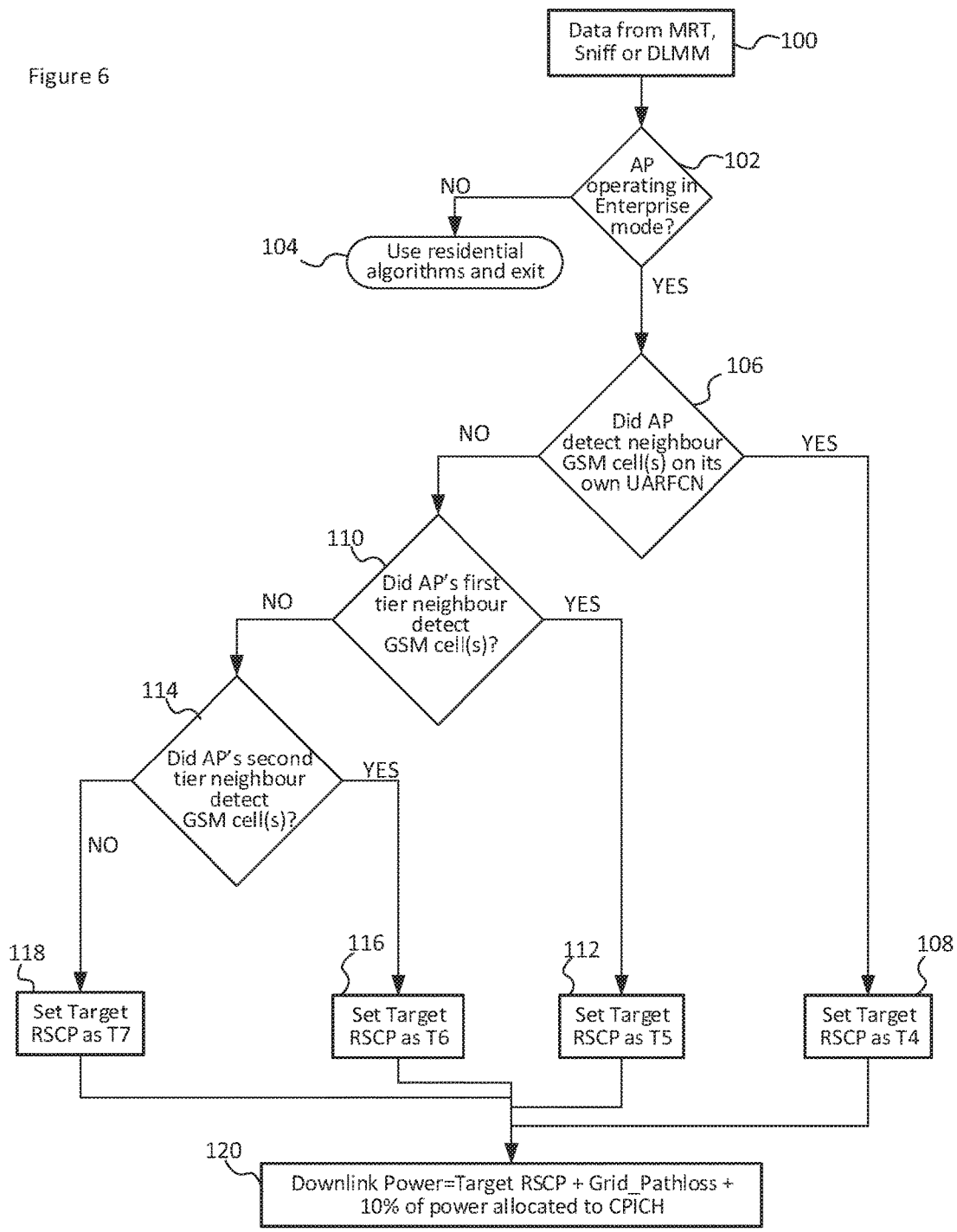
FIG. 6 is a flow chart illustrating another process for setting a downlink power in a basestation.
Figure 7:
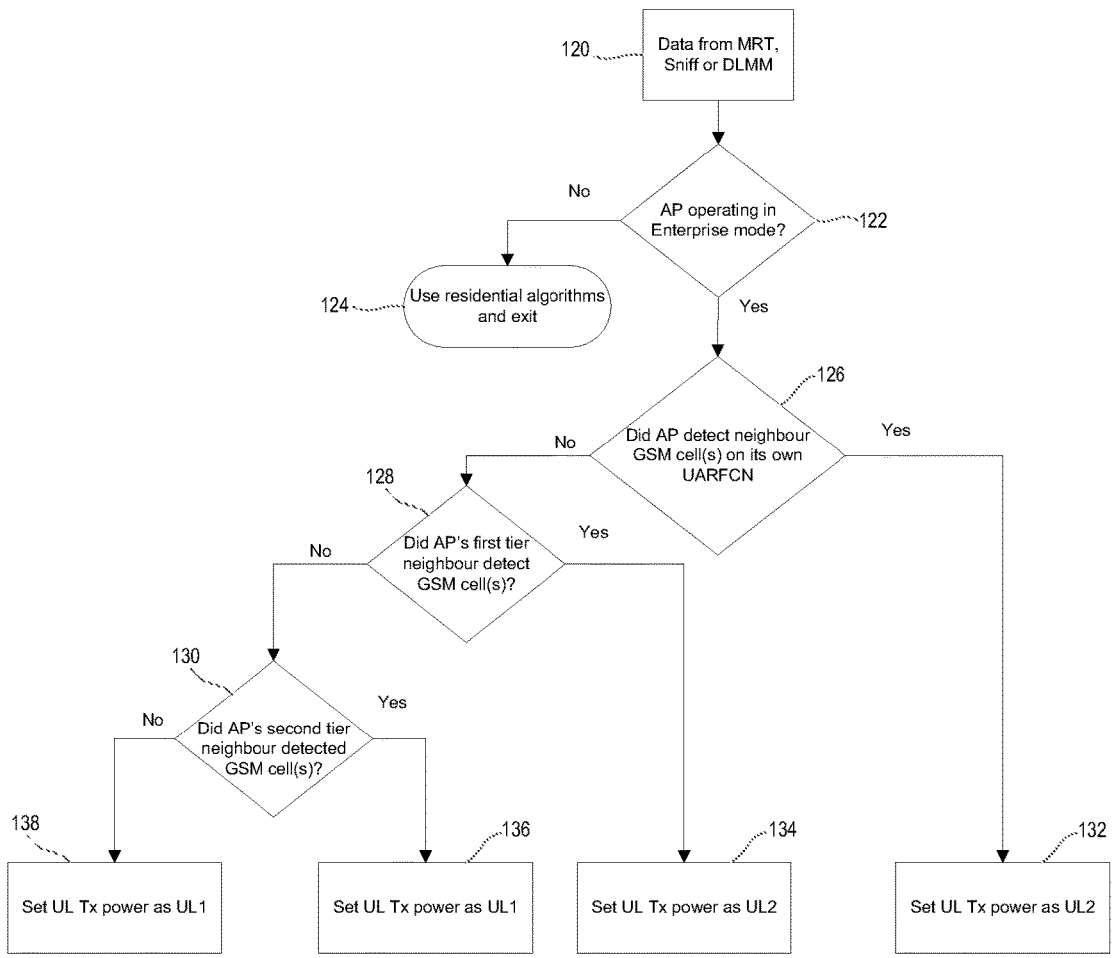
FIG. 7 is a flow chart illustrating another process for setting an uplink power for transmissions to a basestation.

FIG. 6 is a flow chart illustrating in general terms the process followed by a small cell basestation in a co-GSM deployment when setting its downlink power level. This procedure is preferably performed whenever the small cell basestation is powered up. As discussed previously, the procedure may also be performed again whenever it appears that it would produce different results.

With reference to FIG. 6, in a first step 100, the small cell basestation receives information via the DLMM, from a received master relationship table and/or from a fast sniff if ongoing downlink power is being set. In step 102, the small cell basestation then determines whether or not it is operating in enterprise mode that is whether it is operating as part of a group or network of small cell basestations. If not, the small cell basestation applies the appropriate single cell, or residential algorithms and exits the process.

If the small cell basestation is operating in enterprise mode, it then proceeds to establish its degree of association with its macro GSM neighbour. This involves a similar process to that described above for an offset straddled deployment, in which the small cell basestation determines whether or not it was itself able to detect the GSM neighbour, or whether the neighbour was detected by a first, second or lower tier neighbour. The neighbour relation of the detecting basestation establishes the degree of association between the small cell basestation and the GSM neighbour. A target signal strength for signals broadcast from the small cell basestation is then calculated according to the degree of association, allowing the downlink power required to achieve this target signal strength to be calculated.

The above process of establishing a degree of association and calculating a corresponding target signal strength begins in step 106, in which the small cell basestation establishes whether it was itself able to detect the neighbour GSM cell operating on its carrier channel. If so, the small cell basestation sets the target signal strength in step 108 to be $T_4$, the equation for which is discussed below. If the small cell basestation was not able directly to decode its GSM neighbour, it then assesses at step 110 whether or not a first tier neighbour decoded the GSM neighbour. If a first tier neighbour decoded the GSM neighbour then the small cell basestation proceeds at step 112 to set the target signal strength as $T_5$, the equation for which is also discussed below. If a first tier neighbour was not able to decode the GSM neighbour, the small cell basestation proceeds at step 114 to determine whether or not a second tier neighbour decoded the GSM neighbour. If a second tier neighbour decoded the GSM neighbour then the small cell basestation proceeds at step 116 to set the target signal strength as $T_6$. If a second tier neighbour was not able to decode the GSM neighbour, the small cell basestation sets the target signal strength as $T_7$.

The target signal strengths $T_4$, $T_5$, $T_6$ and $T_7$ are calculated according to the following equations:

$$T_4 = \max\{\min\text{enterpriseRSCP}, \text{EquivalentTargetRSCP}\} \quad \text{Equation 9}$$

$$T_5 = \max\{\min\text{enterpriseRSCP}, \text{mean}(\text{EquivalentTargetRSCP}, \min\text{enterpriseRSCP}))\} \quad \text{Equation 10}$$

$$T_6 = \min\text{enterpriseRSCP} \quad \text{Equation 11}$$

$$T_7 = \min\text{enterpriseRSCP} \quad \text{Equation 12}$$

The Equivalent target RSCP in equations 9 and 10 is calculated according to equation 13 below:

$$\text{EquivalentTargetRSCP} = \text{BCHRxLev} - \text{RxLev\_RSCP\_offset} \quad \text{Equation 13}$$

In the co-GSM deployment situation of the present embodiment, the reference signal strength is the equivalent target RSCP, which is calculated according to equation 13. The equivalent target RSCP is based upon BCH RxLev, which is a received signal strength indicator (RSSI) measurement indicating the strength of the received signal for GSM cells. This value is converted to an equivalent RSCP measurement using the configurable parameter RxLev_RSCP_offset. $T_4$ is calculated as the larger of the equivalent target RSCP and the minimum signal strength for enterprise small cells. As previously, the minimum enterprise RSCP is a database parameter that may be configured according to operator requirements and received by the small cell basestation from the LAN. The reference target signal strength is the largest of the potential target signal strengths, corresponding to a close association between the small cell basestation and the neighbouring GSM cell.

The reduced target signal strength is an average of the reference target signal strength and the minimum enterprise signal strength. $T_5$ is set to be the larger of this value and the minimum enterprise signal strength. This lower value is set as the target RSCP in the event that a first tier neighbour detected the neighbouring GSM cell. Finally, $T_6$ and $T_7$ are set to be the minimum enterprise signal strength. As in the first embodiment, the effect of the decision making steps 106, 110 and 114 and the above described equations is to set a higher target signal strength for a small cell basestation having a higher degree of association with the neighbour GSM basestation and a lower target signal strength for a small cell basestation having a lower degree of association with the neighbour GSM cell.

After setting the target RSCP in step 108, 112, 116 or 118, the small cell basestation then proceeds to calculate the downlink power that will provide the target signal strength at step 120. The downlink power is calculated according to Equation 5 which is repeated below:

$$\text{DLPower} = \text{TargetRSCP} + \text{GridPathloss} + 10\% \text{ power-CPICH} \quad \text{Equation 5}$$

As for the first embodiment, the database configurable parameter GridPathloss that is used for initial power setting may be replaced for ongoing power calculations by a Mean Grid Pathloss, which is the estimated average grid pathloss obtained from the participating small cell basestations in the group. Additionally, the initial signal strength measurements received in step 100 may be enhanced by the use of measurements obtained from connected UEs in compressed mode, or by measurements obtained through fast sniff, thus ensuring that ongoing power calculations reflect the current RF environment.

FIG. 7 is a flow chart illustrating in general terms the process followed by a small cell basestation according to the present embodiment when setting the uplink power level for its connected UEs. As for the downlink power setting, this procedure is preferably performed whenever the small cell basestation is powered up. The procedure can then be performed again whenever it appears that it would produce different results.

Referring to FIG. 7, the process for setting uplink power follows initial steps 120, 122 and 124, which are equivalent to steps 100, 102 and 104 followed in the process for setting downlink power. In these steps, the small cell basestation establishes that it is operating in a group of small cell basestations (enterprise mode). If the small cell basestation is in a "residential" deployment, the basestation exits the process of FIG. 5 to follow the appropriate residential power setting algorithms.

Having established that it is in an enterprise deployment, the small cell basestation then proceeds to establish the degree of association of the small cell basestation to the GSM neighbour. As discussed above in connection with downlink power setting, this is done with reference to the neighbour relationship of the small cell basestation to that group member basestation which directly decoded the adjacent GSM cell.

The small cell basestation sets the uplink power limit for its attached UEs to a value $UL_2$ or $UL_1$ according to the degree of association between the small cell basestation and the GSM cell. The small cell basestation conducts substantially equivalent procedural steps to those followed for downlink power setting, checking whether it was the small cell basestation itself that decoded the GSM cell (step 126), or a first tier neighbour (step 128), or a second tier neighbour (step 130). If the neighbouring GSM cell was decoded by the small cell basestation itself or by a first tier neighbour, the small cell basestation sets the uplink power limit to be $UL_2$ in step 132 for self-detection or step 134 for detection by a Tier 1 neighbour. If the GSM neighbour was decoded by a second or lower tier neighbour, the small cell basestation sets the uplink power limit as $UL_1$, in step 136 or 138 respectively. As in the first embodiment, uplink power $UL_1$ is set to be the maximum permitted UL transmit power, a database configurable parameter. The uplink power limit $UL_2$ is calculated according to the following equation:

$$UL_2 = [MS\_TXPWR\_MAX\_CCH - MS\_TXPWR\_MAX\_CCH_{offset}] - [largest RxLev_{meas} - RXL\text{-}EV\_ACCESS\_MIN] \quad \text{Equation 14}$$

In the above equation, MS_TXPWR_MAX_CCH is the maximum transmission power that a mobile station, or MS, may transmit on the random access channel (RACH). This is also the initial power used at call setup prior to GSM UE power control being activated.

$MS\_TXPWR\_MAX\_CCH_{offset}$ is the offset used to derive the maximum power a UE served by a small cell basestation and located at the downlink cell edge of a GSM cell can transmit, such that GSM MSs also at the downlink cell edge can still operate in the uplink. The range corresponds to the highest power class for GSM MS and the lower limit of UMTS UE power control.

RXLEV_ACCESS_MIN is the minimum receiving level that a MS has to receive from a base transceiver station to select that cell as its serving cell. This effectively defines the downlink cell boundary for the cell.

$Rx Lev_{meas}$ is the measured BCH Rx Lev of the GSM cells detected by the small cell basestation that overlap with the small cell basestation carrier or belong to the same GSM cell as the traffic channel carriers that overlap with the small cell carrier. Where there are multiple measurements from different GSM cells, measurements from cells with the lowest cell section parameter RXLEV_ACCESS_MIN are considered first. Cells with the lowest cell section parameter RXLEV_ACCESS_MIN are cells with the widest coverage area, which are also those cells with the smallest uplink transmit power headroom. Protecting these cells will thus also protect smaller cells having greater uplink transmit power headroom.

The process of FIG. 7 ensures that uplink powers are set so as to limit interference to the overlapping channel of the detected neighbouring GSM cell. The appropriate power calculation is selected according to the degree of association between the small cell and the GSM cell, as established via the neighbour relationship of the detecting small cell of the group.

Aspects of the present disclosure thus allow a small cell basestation operating as part of a group of such basestations to set downlink and/or uplink power limits when in an evenly or preferentially offset straddled or co-GSM deployment. The uplink and/or downlink power limits may be set so as to achieve coverage objectives for the group of small cells while also minimising impact on neighbouring macro or GSM basestations.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, a basestation, and/or a server. In some embodiments, one or more of these features may be implemented in hardware, provided external to these elements, or consolidated in any appropriate manner to achieve the intended functionality. The various network elements (e.g., basestation, server) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, a basestation and/or a server described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements of the basestation or server can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors of the basestation or server could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the communication system of the FIGURES could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of elements, modules the potential processing, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the communication system of the FIGURES may be applicable to other exchanges or routing protocols. Moreover, although the communication system of the FIGURES has been illustrated with reference to particular elements and operations that facilitate the communication process, these elements, and operations may be replaced by any suitable architecture or process that achieves the intended functionality of the communication system of the FIGURES.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining, at a first base station, one or more neighbor base stations of the first base station, wherein the first base station and the one or more neighbor base stations belong to a group of base stations;
   detecting an adjacent base station that is adjacent to the first base station and that is not a member of the group of base stations;
   determining a degree of association between the first base station and the adjacent base station based on whether the adjacent base station was detected by the first base station or by at least one neighbor base station of the group of base stations; and
   setting an uplink transmit power for each of one or more user equipment (UE) attached to the first base station based, at least in part, on the degree of association between the first base station and the adjacent base station.

2. The method of claim 1, further comprising:
   determining one or more first tier neighbor base stations of the first base station that belong to the group of base stations, wherein the one or more first tier neighbor base stations are determined based on being detected by the first base station; and
   determining one or more second tier neighbor base stations of the first base station that belong to the group of base stations, wherein the one or more second tier neighbor base stations are determined based on being detected by at least one of the one or more first tier neighbor base stations.

3. The method of claim 2, wherein the degree of association between the first base station and the adjacent base station is determined to be highest based on a determination that the adjacent base station is detected by the first base station or by at least one first tier neighbor base station.

4. The method of claim 3, wherein the setting further comprises setting the uplink transmit power for each of the one or more UE attached to the first base station to a reference uplink transmit power based on a pathloss to the adjacent base station.

5. The method of claim 4, further comprising:
   determining that more than one first tier neighbor base stations have detected the adjacent base station; and
   determining a smallest pathloss to the adjacent base station from among the more than one first tier neighbor base stations that detected the adjacent base station, wherein the reference uplink transmit power is based on the smallest pathloss to the adjacent base station.

6. The method of claim 2, wherein the degree of association between the first base station and the adjacent base station is determined to be lowest based on a determination that the adjacent base station is not detected by the first base station and is not detected by at least one first tier neighbor base station.

7. The method of claim 6, wherein the setting further comprises setting the uplink transmit power for each of the one or more UE attached to the first base station to a maximum allowable uplink transmit power for each of the one or more UE.

8. The method of claim 1, further comprising:
   determining that the adjacent base station operates on a carrier channel that at least partially overlaps a carrier channel of the first base station.

9. At least one non-transitory machine-readable medium comprising instructions encoded for execution by at least one processor, wherein the execution causes the at least one processor to perform operations, comprising:
   determining, at a first base station, one or more neighbor base stations of the first base station, wherein the first base station and the one or more neighbor base stations belong to a group of base stations;
   detecting an adjacent base station that is adjacent to the first base station and that is not a member of the group of base stations;

determining a degree of association between the first base station and the adjacent base station based on whether the adjacent base station was detected by the first base station or by at least one neighbor base station of the group of base stations; and setting an uplink transmit power for each of one or more user equipment (UE) attached to the first base station based, at least in part, on the degree of association between the first base station and the adjacent base station.

10. The at least one non-transitory machine-readable medium of claim 9, further comprising instructions encoded for execution by the at least one processor, wherein the execution causes the at least one processor to perform further operations comprising:

determining one or more first tier neighbor base stations of the first base station that belong to the group of base stations, wherein the one or more first tier neighbor base stations are determined based on being detected by the first base station; and determining one or more second tier neighbor base stations of the first base station that belong to the group of base stations, wherein the one or more second tier neighbor base stations are determined based on being detected by at least one of the one or more first tier neighbor base stations.

11. The at least one non-transitory machine-readable medium of claim 10, wherein the degree of association between the first base station and the adjacent base station is determined to be highest based on a determination that the adjacent base station is detected by the first base station or by at least one first tier neighbor base station.

12. The at least one non-transitory machine-readable medium of claim 11, wherein the setting further comprises setting the uplink transmit power for each of the one or more UE attached to the first base station to a reference uplink transmit power based on a pathloss to the adjacent base station.

13. The at least one non-transitory machine-readable medium of claim 12, further comprising instructions encoded for execution by the at least one processor, wherein the execution causes the at least one processor to perform further operations comprising:

determining that more than one first tier neighbor base stations have detected the adjacent base station; and determining a smallest pathloss to the adjacent base station from among the more than one first tier neighbor base stations that detected the adjacent base station, wherein the reference uplink transmit power is based on the smallest pathloss to the adjacent base station.

14. The at least one non-transitory machine-readable medium of claim 10, wherein the degree of association between the first base station and the adjacent base station is determined to be lowest based on a determination that the adjacent base station is not detected by the first base station and is not detected by at least one first tier neighbor base station.

15. The at least one non-transitory machine-readable medium of claim 14, wherein the setting further comprises setting the uplink transmit power for each of the one or more UE attached to the first base station to a maximum allowable uplink transmit power for each of the one or more UE.

16. The at least one non-transitory machine-readable medium of claim 9, further comprising instructions encoded for execution by the at least one processor, wherein the execution causes the at least one processor to perform further operations comprising:

determining that the adjacent base station operates on a carrier channel that at least partially overlaps a carrier channel of the first base station.

17. A first base station comprising:

at least one memory element for storing data; and at least one processor for executing instructions associated with the data, wherein the executing causes the first base station to perform operations comprising:

determining one or more neighbor base stations of the first base station, wherein the first base station and the one or more neighbor base stations belong to a group of base stations;

detecting an adjacent base station that is adjacent to the first base station and that is not a member of the group of base stations;

determining a degree of association between the first base station and the adjacent base station based on whether the adjacent base station was detected by the first base station or by at least one neighbor base station of the group of base stations; and setting an uplink transmit power for each of one or more user equipment (UE) attached to the first base station based, at least in part, on the degree of association between the first base station and the adjacent base station.

18. The first base station of claim 17, wherein the executing causes the first base station to perform further operations comprising:

determining one or more first tier neighbor base stations of the first base station that belong to the group of base stations, wherein the one or more first tier neighbor base stations are determined based on being detected by the first base station; and determining one or more second tier neighbor base stations of the first base station that belong to the group of base stations, wherein the one or more second tier neighbor base stations are determined based on being detected by at least one of the one or more first tier neighbor base stations.

19. The first base station of claim 18, wherein the degree of association between the first base station and the adjacent base station is determined to be highest based on a determination that the adjacent base station is detected by the first base station or by at least one first tier neighbor base station and wherein the setting further comprises setting the uplink transmit power for each of the one or more UE attached to the first base station to a reference uplink transmit power based on a pathloss to the adjacent base station.

20. The first base station of claim 18, wherein the degree of association between the first base station and the adjacent base station is determined to be lowest based on a determination that the adjacent base station is not detected by the first base station and is not detected by at least one first tier neighbor base station and wherein the setting further comprises setting the uplink transmit power for each of the one or more UE attached to the first base station to a maximum allowable uplink transmit power for each of the one or more UE.

* * * * *